United States Patent
Toyoguchi et al.

(10) Patent No.: US 7,771,132 B2
(45) Date of Patent: Aug. 10, 2010

(54) SHUTTER UNIT, SHUTTER UNIT WITH BUILT-IN LENS, AND IMAGING APPARATUS

(75) Inventors: Takanori Toyoguchi, Saitama (JP); Naoto Shiga, Saitama (JP); Fuyuhiko Shimamura, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 342 days.

(21) Appl. No.: 11/779,628

(22) Filed: Jul. 18, 2007

(65) Prior Publication Data

US 2008/0031617 A1 Feb. 7, 2008

(30) Foreign Application Priority Data

Aug. 4, 2006 (JP) ............................. 2006-213791
Sep. 25, 2006 (JP) ............................. 2006-258257

(51) Int. Cl.
*G03B 9/08* (2006.01)

(52) U.S. Cl. ..................... 396/464; 396/452; 396/463

(58) Field of Classification Search ................ 396/352, 396/353, 452–459, 463, 464, 467–469, 506, 396/508
See application file for complete search history.

(56) References Cited

U.S. PATENT DOCUMENTS

| | | | |
|---|---|---|---|
| 4,696,560 A | | 9/1987 | Ogihara et al. |
| 5,489,959 A | * | 2/1996 | Akada .......................... 396/508 |
| 6,269,226 B1 | * | 7/2001 | Aoshima ..................... 396/458 |
| 6,733,192 B2 | * | 5/2004 | Watanabe .................... 396/463 |
| 6,960,848 B2 | * | 11/2005 | Naganuma et al. ............. 310/37 |
| 7,374,352 B2 | | 5/2008 | Kudo |
| 7,410,310 B2 | | 8/2008 | Kihara |
| 2005/0218743 A1 | * | 10/2005 | Mizumaki .................... 310/185 |
| 2005/0286889 A1 | * | 12/2005 | Kihara ........................ 396/463 |
| 2006/0006968 A1 | * | 1/2006 | Mizumaki .................... 335/272 |
| 2006/0008270 A1 | * | 1/2006 | Naganuma ................... 396/469 |
| 2006/0276072 A1 | * | 12/2006 | Fukasawa .................... 439/397 |
| 2009/0052886 A1 | * | 2/2009 | Watanabe et al. ............. 396/486 |

FOREIGN PATENT DOCUMENTS

| | | |
|---|---|---|
| CN | 1369737 A | 9/2002 |
| CN | 1727981 A | 2/2006 |
| CN | 1734344 A | 2/2006 |
| JP | 60-235125 A | 11/1985 |
| JP | 8-152667 A | 6/1996 |
| JP | 2002-14387 A | 1/2002 |
| JP | 2002-107793 A | 4/2002 |

* cited by examiner

*Primary Examiner*—W. B. Perkey
*Assistant Examiner*—Warren K Fenwick
(74) *Attorney, Agent, or Firm*—Foley & Lardner LLP

(57) ABSTRACT

A shutter unit is equipped with a base plate, a yoke, a coil that is attached in the middle of the yoke to excite the yoke, and a rotor that rotates in a predetermined direction by excitation of the yoke. A lens frame is formed on the base plate. The yoke has a substantially annular shape so as to be disposed on the base plate encircling the circumference of the lens frame. Thus, by forming the yoke in a substantially annular shape, the yoke and the coil can be moved toward an optical axis, and consequently, the shutter unit can be downsized.

21 Claims, 18 Drawing Sheets

SHUTTER UNIT, SHUTTER UNIT WITH BUILT-IN LENS, AND IMAGING APPARATUS

BACKGROUND OF THE INVENTION

1. Field of the Invention

The present invention relates to a shutter unit, a shutter unit with a built-in lens, and an imaging apparatus.

2. Description of the Related Art

There have been built-in camera modules for imaging apparatuses, such as a camera-equipped cellular phone, a digital camera, etc., that are equipped with a mechanical shutter unit that regulates the quantity of light reaching photo elements of a charge-coupled device (CCD) by opening or shutting sectors (shutter blades). These types of shutter units frequently employ an actuator that opens or shuts sectors connected to a rotor by rotating the rotor using a magnetic force generated by exciting a yoke by the supply of electricity to a coil located in the middle of the yoke such as that described in Japanese Patent Application Laid-Open Publication No. s60-235125.

In FIGS. 23 and 24 an example of a shutter unit based on conventional techniques is shown.

A shutter unit 1700 includes a base plate 1710, and an actuating unit 1720 that is composed of a coil 1721 and a yoke 1722 that is excited by electrical supply to the coil 1721 is disposed on a surface 1710A formed on the object side of a base plate 1710 along the direction of an optical axis 1700A.

A rotor 1730 is disposed so as to penetrate the base plate 1710 from the surface 1710A of the base plate 1710 to the opposite surface (imaging plane side) along the direction of the optical axis 1700A such that the rotor 1730 can rotate freely. The cylindrical surface of the rotor 1730 is magnetized by a dipole permanent magnet. The coil 1721, the yoke 1722, and the rotor 1730 are enclosed by a partition plate 1740 that retains the rotor 1730 as a bearing.

Inside the base plate 1710, sectors (not illustrated) coupled with the rotating motion of the rotor 1730 are disposed to open and shut the opening 1710B formed on the base plate 1710. The base plate has a depression 1710C, that has an internal diameter larger than that of the opening 1710B, to set a lens unit 1900 that is shown in FIGS. 25 and 26.

At the rotor unit 1730 of the shutter unit 1700, a magnetic force (attractive force) in a predetermined direction is generated by the excitation of the yoke 1722 with an electrical supply to the coil 1721. The rotor 1730 thus rotates in the predetermined direction. The opening 1710B is opened or shut by the sectors coupled with the rotating motion of the rotor 1730.

As shown in FIG. 23, the yoke 1722 has a substantially U-shaped to enable, when disposed on the base plate, the rotor 1730 to be located between the two ends of the yoke 1722 and to enable the coil 1721 to be arranged in the middle, and to avoid the interference of a lens frame 1910D of the lens unit 1900 when the shutter unit 1700 and the lens unit 1900 are assembled and integrated.

The size of the shutter unit 1700 is minimized as far as practicable by the arrangement of the yoke 1722 and the coil 1721 having sufficient space from the lens frame 1910D on the base plate 1710 so that the yoke 1722 and the coil 1721 do not interfere with the lens frame 1910D. The outer dimensions of the shutter unit 1700 orthogonal to the direction of the optical axis 1700A (width) is denoted as W3.

FIGS. 25 and 26 are schematics of a conventional lens unit. A lens unit 1900 equipped with a base plate 1910 is integrated with the shutter unit 1700, and a cylindrical lens frame 1910D having a circular opening 1910C that is coaxial with the optical axis 1700A is formed on a surface 1910A on the object side of the base plate 1910 along the direction of the optical axis 1700A so that the cylindrical lens frame 1910D projects from the surface 1910A. Inside the opening 1910C formed in the lens frame 1910D, a lens cluster 1920 composed of lenses 1921 and 1922 is disposed.

FIG. 27 is a schematic of the shutter unit 1700 and the lens unit 1900 that are integrated. The shutter unit 1700 and the lens unit are assembled separately in individual manufacturing processes. As shown in FIG. 27, the shutter unit 1700 and the lens unit 1900 are assembled and integrated so that the surface 1710A of the shutter unit 1700 contacts the surface 1910B of the lens unit 1900, and so that the lens 1922 installed in the lens unit 1900 is partially accommodated in the space 1710C formed in the shutter unit 1700.

A shutter installed in the shutter unit 1700 has two shutter blades (sectors), and when the sectors are in a closed position, the sectors shut an opening that is coaxial with an optical axis by overlapping each other leaving a gap equivalent with their thickness. These sectors contact a surface of the case of the shutter unit 1700, and therefore, they move (slide) as they rub the surface in the motion of opening and shutting. There is a configuration to reduce the sliding friction generated when the sectors move by adding, inside the shutter unit, suitably shaped slide guides that contact the sectors such as that described in Japanese Patent Application Laid-Open Publication No. H8-152667). In addition, there is a configuration that includes light shields that prevent the leakage of light to the opening from the gap between two sectors as well as reduce sliding friction such as that described in Japanese Patent Application Laid-Open Publication No. 2002-14387, and a configuration that includes light shields to prevent light from penetrating to the optical axis from the periphery of two plates constituting a blade chamber to accommodate the sectors such as that described in Japanese Patent Application Laid-Open Publication No. 2002-107793.

In the conventional techniques above, however, a substantially U-shaped yoke that allows both an arrangement of a rotor and an attachment of a coil between the two ends of the yoke is commonly employed. In case the substantially U-shaped yoke is employed for a shutter unit, sufficient space must be secured to arrange the yoke and coil in a position outside of the optical axis, and therefore, the difficulty of shutter unit downsizing has been a problem.

With regard to a shutter unit described in Japanese Patent Application Laid-Open Publication No. 60-235125, although configuration allows downsizing upon integrating a shutter unit 1700 and a lens unit 1900, making the outer dimensions of the shutter unit along the direction of an optical axis 1700A (thickness) of W4, there has been a problem that the downsizing of the outer dimensions of the shutter unit along the direction of the optical axis 1700A is not easy as long as the shutter unit configuration described above is employed.

In order to solve the problem, consideration has been given to the installation of a lens and a shutter to a lens frame of a lens unit and a shutter unit that have been integrated. The diameter of the lens housing portion (diameter along the direction orthogonal to an optical axis) of the integrated lens frame must be slightly larger than lens diameter as a lens is required to be aligned. Thus, the opening of the lens frame to insert the lens needs to be formed larger proportionally to the housing diameter. In case sectors are arranged on the opening side of the lens frame, a problem arises in that the opening diameter becomes larger than the desired aperture diameter. Thus, a desired aperture diameter cannot be obtained whereas downsizing (thickness W4) can be realized by integrating a lens unit and a shutter unit into a single lens frame.

The downsizing of a sector portion, i.e., outer dimension orthogonal to the direction of an optical axis C (width and length), is also limited. The yoke that constitutes a part of a drive mechanism to open and shut sectors is formed in a shape that can accommodate a rotor between the two ends of the yoke. A substantially U-shaped is common for attaching the coil. In case of such a substantially U-shaped yoke, the downsizing of a shutter unit has been difficult as the width and length of a lens frame become large due to the securing of sufficient space to arrange a yoke and a coil in the position away from an optical axis.

In recent years, the downsizing of a shutter unit has been a particular problem for the development of camera modules in the background that compact camera modules are desired with progressing downsizing of camera phones and digital cameras.

SUMMARY OF THE INVENTION

It is an object of the present invention to at least solve the above problems in the conventional technologies.

A shutter unit according to one aspect of the present invention includes a base plate having an opening; a drive unit including a coil and a yoke; a rotor that rotates by operation of the drive unit; and a sector unit that opens and shuts the opening by a rotating motion of the rotor, wherein the yoke is disposed and formed in a shape fitting to and engaging with a peripheral shape of the opening.

A shutter unit according to another aspect of the present invention includes a base plate having an opening; a drive unit including a coil and a yoke; a rotor that rotates by operation of the drive unit; and a sector unit that opens and shuts the opening by a rotating motion of the rotor, wherein the yoke is disposed and formed in a substantially annular shape to encircle a circumference of the opening.

A shutter unit according to still another aspect of the present invention includes a base plate that has an opening and a space; a drive unit that includes a coil and a yoke; a rotor that rotates by operation of the drive unit; a sector unit that is disposed in the space, and that opens and shuts the opening by a rotating motion of the rotor; and a sheet member that has an exposure aperture with a predetermined exposure diameter on an optical axis.

An imaging apparatus according to still another aspect of the present invention includes the shutter unit described above.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Referring to the accompanying drawings, exemplary embodiments according to the present invention are explained in detail below.

Figure 1:
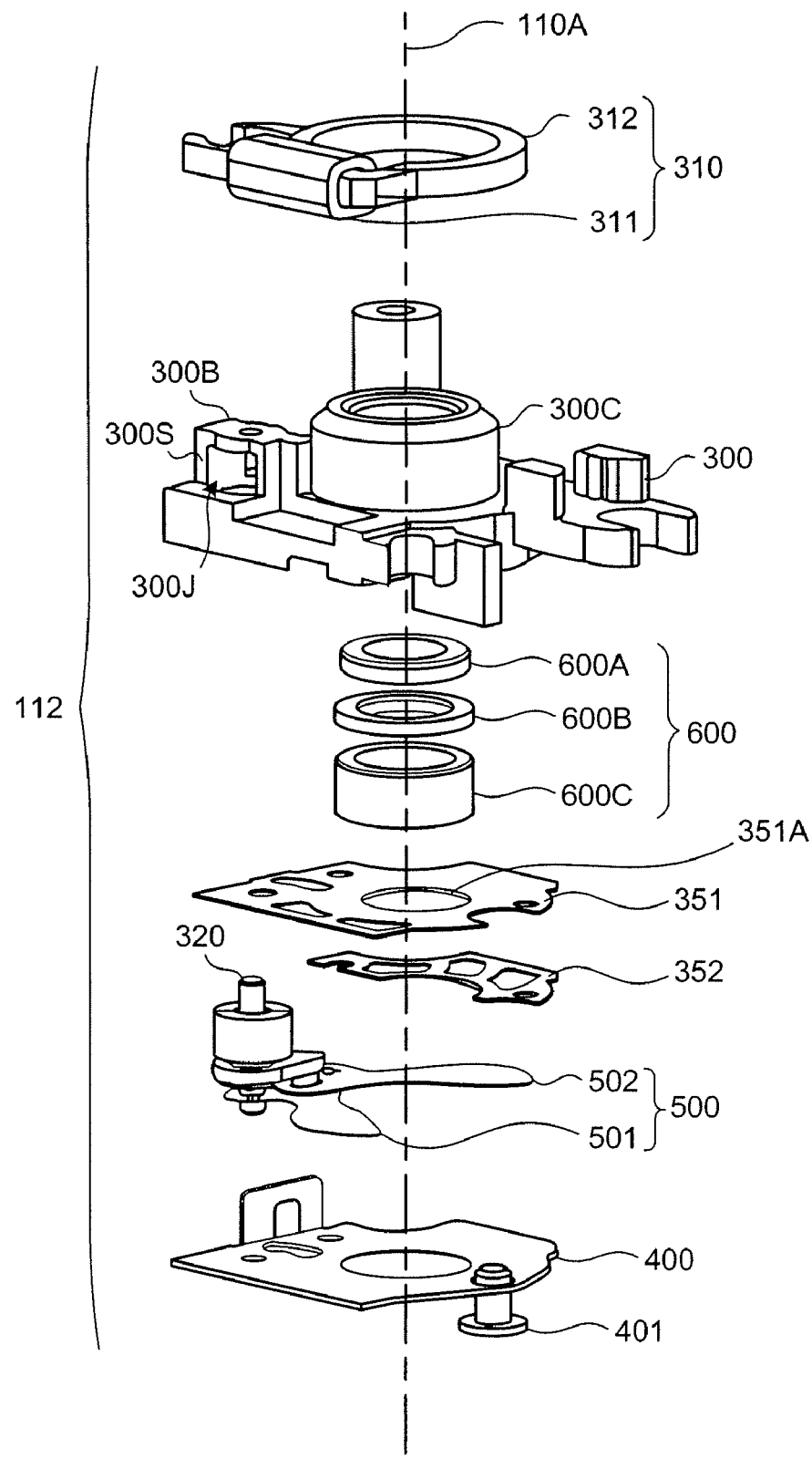
FIG. 1 is an exploded view of a shutter unit according to the present invention.
Figure 2:
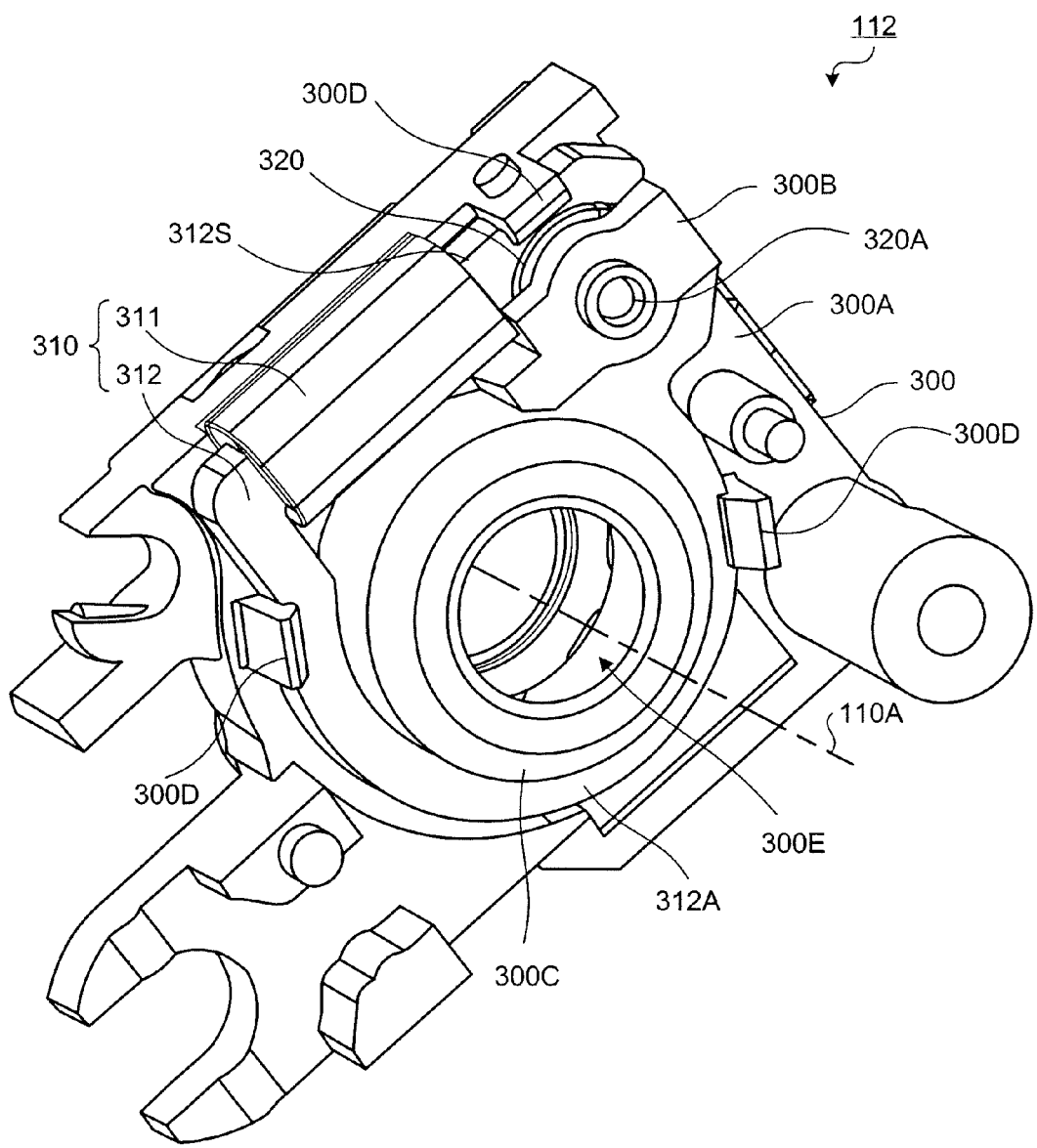
FIG. 2 is a perspective view of the shutter unit.
Figure 3:
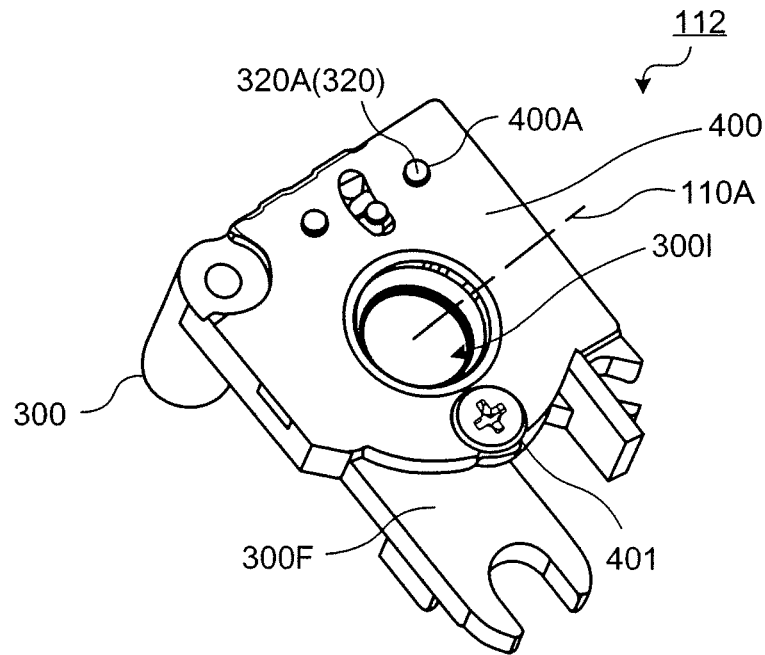
FIG. 3 is a perspective view of the shutter unit with a back plate covering a sector unit.
Figure 4:
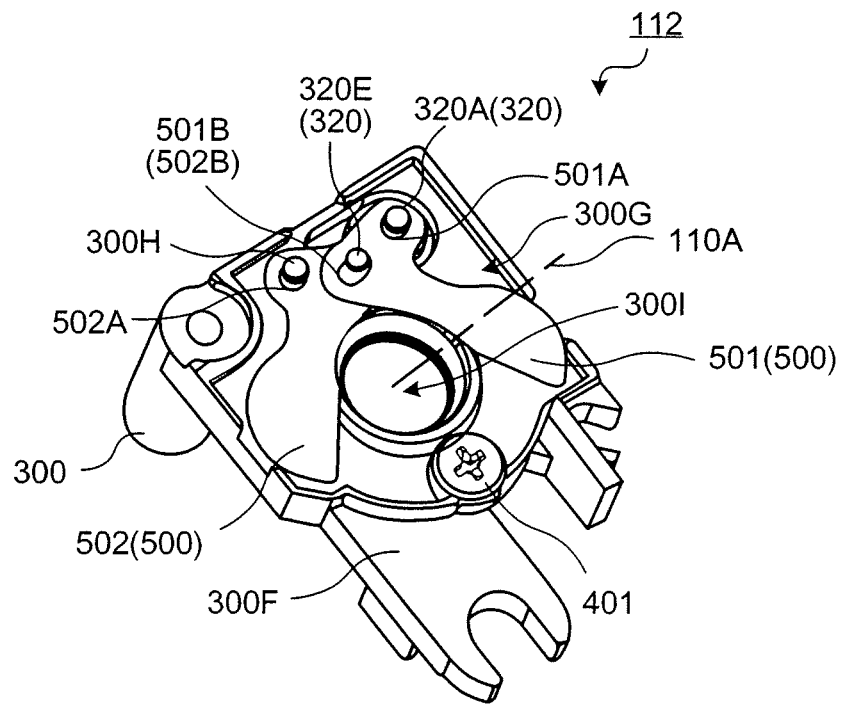
FIG. 4 is a perspective view of the shutter unit with a back plate detached to show sectors of a sector unit.

The first embodiment is an example of a cellular telephone that employs a shutter unit or a shutter unit with a built-in lens according to the present invention. FIG. 1 is a schematic of a shutter unit 112 according to the present invention. FIGS. 2, 3, and 4 are the perspective views of the shutter unit 112.

Inside a lens frame 300C, a second lens cluster 600 disposed in the order of a lens 600A, a lens spacer 600B, and a lens 600C from the object side along the direction of an optical axis 110A is adhesively fixed by applying an adhesive agent to the outer circumference of the lens 600C.

As shown in FIG. 1, in the assembling process of the shutter unit 112, a drive unit 310 is inserted into a lens frame 300C from the object side along the optical axis 110A, is positioned and set by the lens frame 300C and a positioning portion 300S formed on a bearing 300B, and is then anchored by anchor flukes (FIG. 2).

The second lens cluster 600 is inserted into the lens frame 300C from the imaging plane side along the optical axis 110A. A rotor 320 is then inserted into a rotor housing 300J from the image side along the optical axis 110A, and is journalled by the bearing 300B.

A first sheet member 351 and a second sheet member 352 are layered and arranged in a space 300G (FIG. 4). A sector unit 500 is arranged on top of the first sheet member 351 and the second sheet member 352 in the space 300G (FIG. 4) so as to engage with the rotor 320. The detailed positional relationship of the first, second sheet members 351, 352, respectively, and the sector unit 500 are described later. The rotor 320 and the sector unit 500 are finally retained by a back plate 400 that is secured by screws 401 to close the space 300G.

FIG. 2 illustrates the object side of the shutter unit 112 along the direction of the optical axis 110A. The shutter unit is equipped with a base plate 300, and on a surface 300A formed on the object side of the base plate 300 along the direction of the optical axis 110A, a drive unit 310 that is composed of a yoke 312 and a coil 311 that is located in the middle of the yoke 312 to excite the yoke 312 by electrical supply are disposed.

Between the two ends of the yoke 312 on the base plate 300, the rotor housing 300J (FIG. 1) is formed to accommodate the rotor 320 so that the rotor penetrates from the surface 300A of the base plate 300 toward a surface 300F (FIG. 3) on the opposite side (imaging plane side) along the direction of the optical axis 110A. The rotor 320 accommodated in the rotor housing 300J is journalled at a spindle 320A thereof by the bearing 300B formed so as to project from the base plate 300, and hence movement in the direction of the optical axis is prevented.

The bearing 300B, positioned between the two ends of the yoke 312 at the cylindrical portion thereof, is provided with the positioning portion 300S (FIG. 1) having a fixed width to maintain the distance of the sides of the rotor 320 from the both ends of the yoke 312 at a predetermined distance by positioning and setting the two ends of the yoke 312.

The cylindrical lens frame (frame) 300C has a circular opening 300E coaxial with the optical axis 110A and is formed on the base plate 300 so as to project from the surface 300A of the base plate 300. Inside the opening 300E formed in the lens frame 300C, the second lens cluster 600 (FIG. 1) is disposed.

As shown in FIG. 2, the yoke 312 is formed in a shape that enables the yoke 312 to fit with the outer circumferential shape of the lens frame 300C that is formed in an annular shape. The yoke 312 is composed of an annular portion 312A that has a substantially annular (substantially circular) shape to fit with the outer circumference of the lens frame 300C and a straight portion 312S to which the coil 311 is attached. The yoke 312 is disposed on the base plate 300 so as to encircle the outer circumference of the lens frame 300C. The yoke 312 is fitted to the outer circumference of the lens frame 300C, positioned, and set.

The annular portion 312A of the yoke 312 has an inner diameter that allows the inner circumference to contact the outer circumference of the lens frame 300C, and that allows fitting by light press. Thus, by light press fitting of the yoke 312 on the lens frame 300C, the coil 311 and the yoke 312 can be easily and securely positioned and set. The yoke 312 is not limited to be substantially annular shape but may be shaped to fit with the outer circumference of the lens frame 300C by encircling the lens frame 300C and to contact the shape of the outer circumference of the lens frame 300C in case, e.g., the lens frame 300C may not be formed in an annular shape.

As shown in FIG. 2, the shutter unit 112 in the present embodiment employs a configuration to anchor the yoke 312 that is positioned and fitted to the outer circumference of the lens frame 300C by multiple anchor flukes (fitting portion) 300D formed on the base plate 300. Thereby, in addition to the coil 311 and the yoke 312 being easily and securely positioned and set, easy attachment and detachment of the coil 311 and the yoke 312 are also possible.

FIG. 3 illustrates the imaging plane side of the shutter unit 112 along the optical axis 110A. On the surface 300F of the base plate 300, a circular opening 300I that is coaxial with the optical axis 110A and connected to the opening 300E (FIG. 2) formed on the lens frame 300C is formed.

On the surface 300F of the base plate 300, the depressed space 300G (FIG. 4) to accommodate the sector unit 500 is formed, and the space 300G is closed by a back plate 400 that is composed of sheet members. The back plate 400 is secured onto the base plate 300 by screws 401. On the back plate 400, an opening 400A to journal the spindle 320A of the rotor 320 is formed.

FIG. 4 illustrates the imaging plane side of the shutter unit 112 along the optical axis 110A with the back plate 400 detached. On the surface 300F of the base plate 300, the space 300G is formed. In the space 300G, a sector unit 500 is disposed and includes sectors A 501 and B 502 that engage with the rotor 320 disposed so as to penetrate from the surface 300A (FIG. 2) of the base plate 300 toward the surface 300F and that open and shut with the rotational movement of the rotor 320.

The sector A 501 is journalled by the spindle 320A formed on the rotor 320 penetrating an opening 501A formed in the sector A 501. The sector B 502 is journalled by a projection portion 300H that is formed on the surface 300F and that penetrates an opening 502A formed in the sector B 502. In the sector A 501, a slot-like opening 501B is formed where a projection portion 320E that is explained by FIG. 5 penetrates. Also in the sector B 502, a slot-like opening 502B is formed where the projection portion 320E penetrates.

Figure 5:
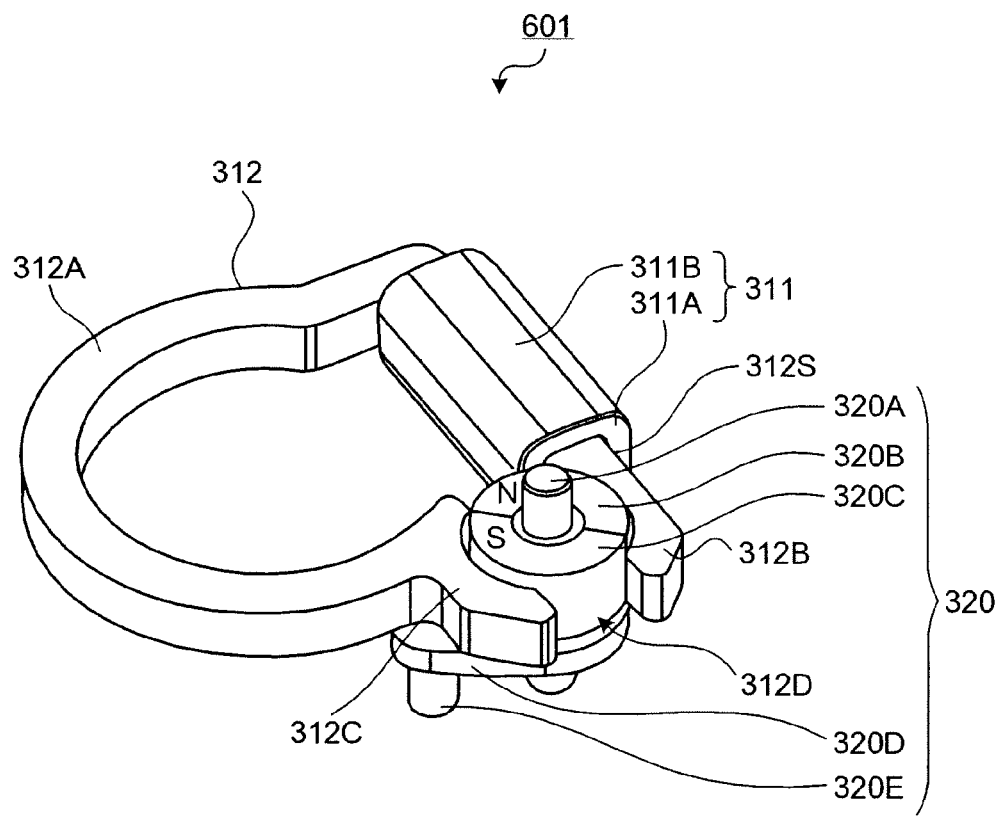
FIG. 5 is a perspective view of a drive unit and a rotor.

FIG. 5 illustrates perspective views of the drive unit 310 and the rotor 320.

The coil 311 is composed of a bobbin 311A and copper wire 311B. The bobbin 311A is made of polycarbonate and ferrite, and has a cylindrical shape. The copper wire 311B is multiply-wound around the bobbin 311A. The yoke 312 is inserted into the inner space of the bobbin 311A. The yoke 312 has end portions 312B and 312C that are excited when the coil 311 is supplied with electricity.

On the rotor 320, a dipolarized outer circumference is formed by attaching permanent magnets 320B and 320C that are magnetized to a north pole and a south pole, respectively, onto the periphery of the spindle 320A. The portion of the rotor 320 with the dipolarized outer circumference has diameter smaller by a predetermined amount than a space 312D between the ends 312B and 312C of the yoke 312 so as to rotate freely within the space 312D.

An arm 320D that rotates with the spindle 320A is formed on the rotor 320. A projection portion 320E that penetrates the openings 501B and 502B formed in the sectors A 501 and B 502, respectively, when the rotor 320 is assembled into a shutter unit 112, is formed near the tip of the arm 320D.

Figure 6:
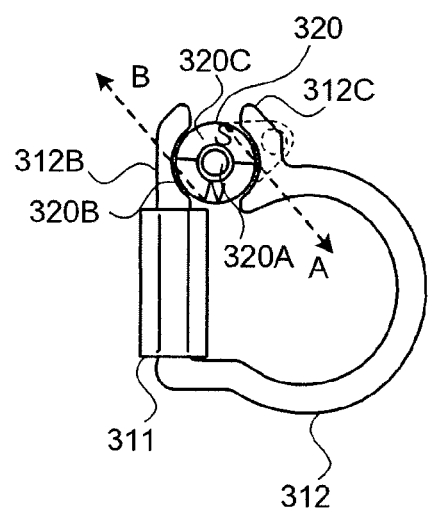
FIG. 6 is a plan view illustrating the condition of the rotor when the sector unit fully shuts.

FIG. 6 is a schematic briefly illustrating the condition of the rotor 320 when the sector unit 500 fully shuts. When the sector unit 500 fully shuts, the rotor 320 stays static at a predetermined position as the coil 311 is not supplied with electricity, and thus the end portions 312B and 312C of the yoke 312 are not excited.

In such a condition that the rotor 320 remains static at the predetermined position, the end portions 312B and 312C of the yoke are then energized to create a south pole and north pole, respectively, by supplying electricity to the coil 311.

Thus, at the permanent magnet 320B attached to the rotor 320 and magnetized to a north pole, a magnetic force (attractive force) is generated in the direction of the end portion 312B (direction B in FIG. 6) of the yoke 312 that is energized to create a south pole. At the permanent magnet 320C attached to the rotor 320 and magnetized to a south pole, a magnetic force (attractive force) is generated in the direction of the end portion 312C (direction A in FIG. 6) of the yoke 312 that is energized to create a north pole.

The rotor 320 starts to rotate clockwise about the spindle 320A by the magnetic force generated in a predetermined direction at the permanent magnets 320B and 320C.

Figure 7:
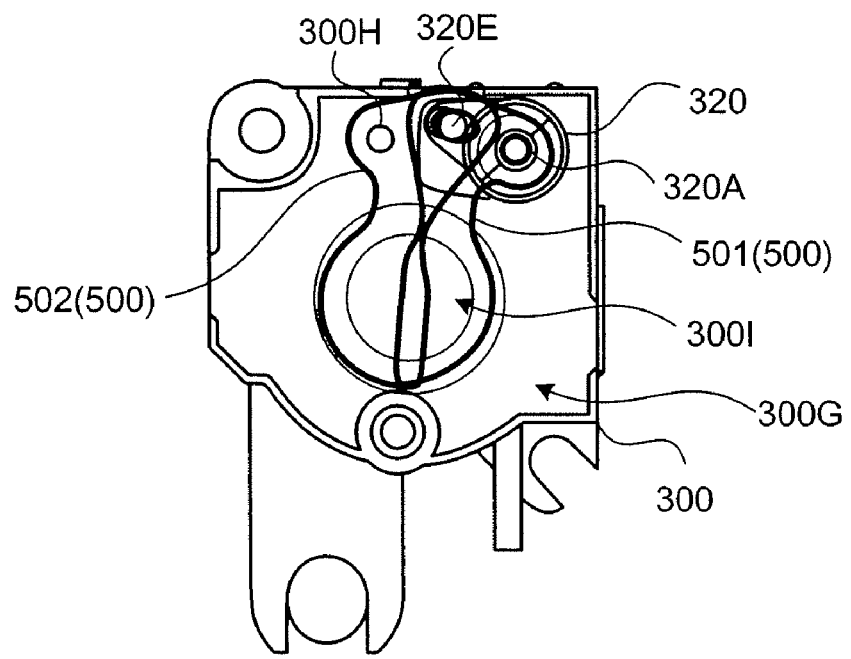
FIG. 7 is a plan view illustrating the condition of the sector unit when the sector unit fully shuts.

FIG. 7 is a schematic illustrating the condition of the sector unit 500 when the sector unit 500 fully shuts. When the sector unit 500 fully shuts, the opening 300I is closed by the sectors A 501 and B 502. As the sector unit 500 opens and shuts coupled with the rotation of the rotor 320, the sector unit 500 maintains a fully shut position when the rotor 320 remains static as shown in FIG. 6. In the condition that the opening 300I is shut, light reflected by an object and bound for a CCD 114 (FIG. 15) by penetrating through the opening 300I is blocked by the sector unit 500 shutting the opening 300I.

As explained by FIG. 6, the projection portion 320E formed on the rotor 320 starts to rotate in the direction to open the sector 500 from the fully shut position when the rotor 320 starts to rotate clockwise about the spindle 320A.

The sector A 501 is urged by the projection portion 320E and starts to rotate about the spindle 320 of the rotor 320 in the direction to open. The sector B 502 is also urged by the projection portion 320E and starts to rotate about the projection portion 300 in the direction to open. As the both sectors A 501 and B 502 rotate in the direction to open, the opening 300I is gradually opened.

Figure 8:
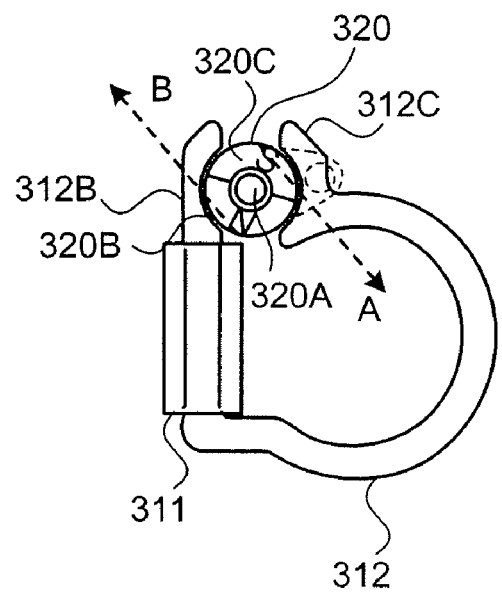
FIG. 8 is a plan view illustrating the condition of the rotor when the sector unit starts to open.

FIG. 8 is a schematic illustrating the condition of a rotor 320 when a sector unit 500 starts to open. The rotor 320 is at a position slightly rotated clockwise about a spindle 320A from the predetermined static position by a magnetic force generated at the permanent magnets 320B and 320C by the supply of electricity to the coil 311.

Figure 9:
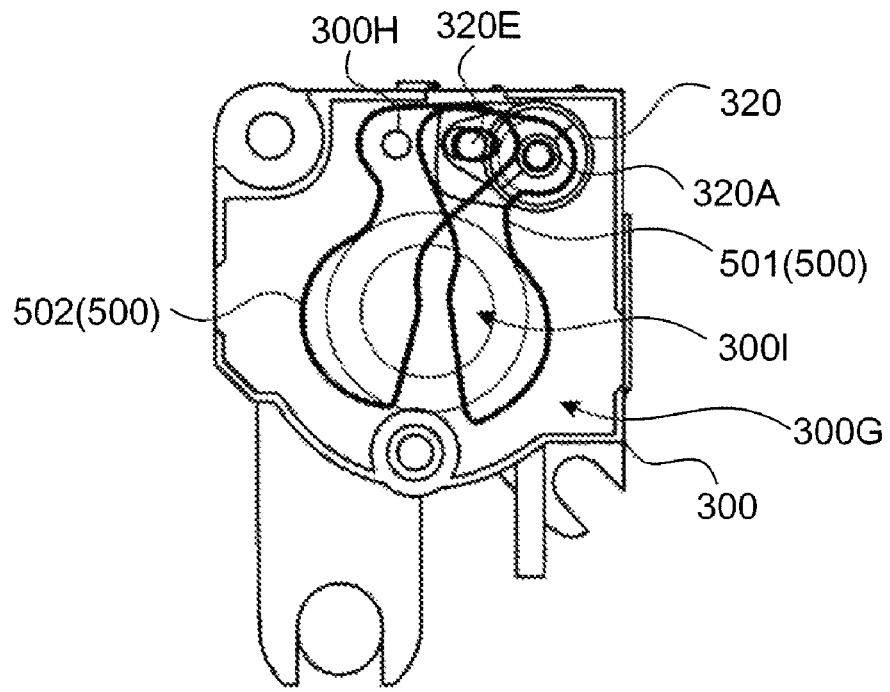
FIG. 9 is a plan view illustrating the condition of the sector unit when the sector unit starts to open.

FIG. 9 is a schematic illustrating the condition of the sector unit 500 when the sector unit 500 starts to open. The sector unit 500 is at a position slightly rotated in the direction to open both the sectors A 501 and B 502 from a shut position of the opening 300I via coupling with the rotation of the projection portion 320E in the direction to open the sector unit 500. Thus, the opening 300I is slightly opened.

Figure 10:
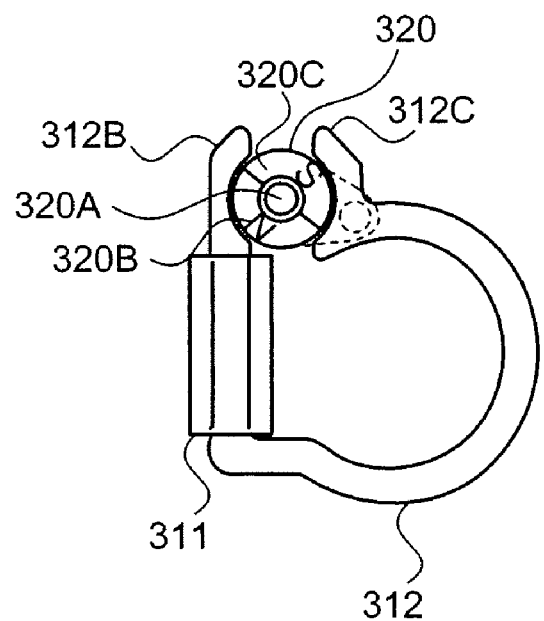
FIG. 10 is a plan view illustrating the condition of the rotor when the sector unit fully opens.

FIG. 10 is a schematic illustrating the condition of the rotor 320 when the sector unit 500 fully opens. The rotor 320 remains static at a predetermined stop position after further clockwise rotation about the spindle 320A from the slightly rotated position as shown in FIG. 8.

Figure 11:
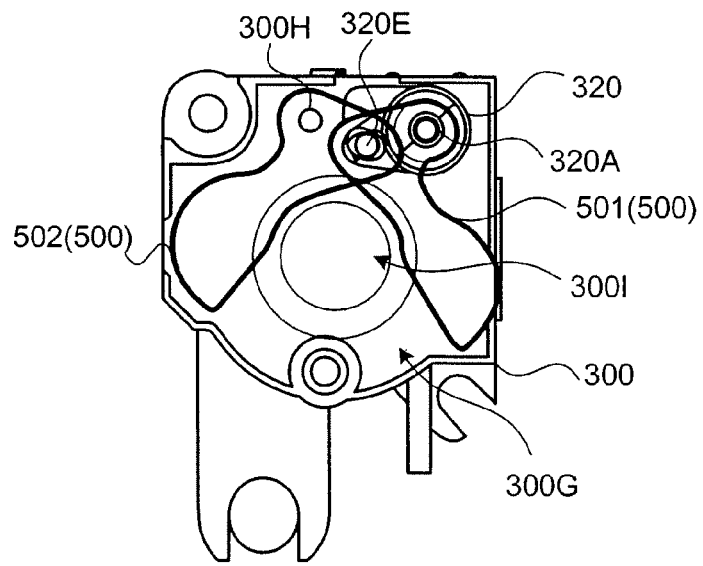
FIG. 11 is a plan view illustrating the condition of the sector unit when the sector unit fully opens.

FIG. 11 is a schematic illustrating the condition of the sector unit 500 when the sector unit 500 fully opens. The sector unit 500 remains static at a predetermined stop position after further rotation in the direction to open the both sectors A 501 and B 502 from the slightly rotated position as shown in FIG. 9. Thus, the sector unit 500 fully opens and the opening 300I is fully opened.

Figure 12:
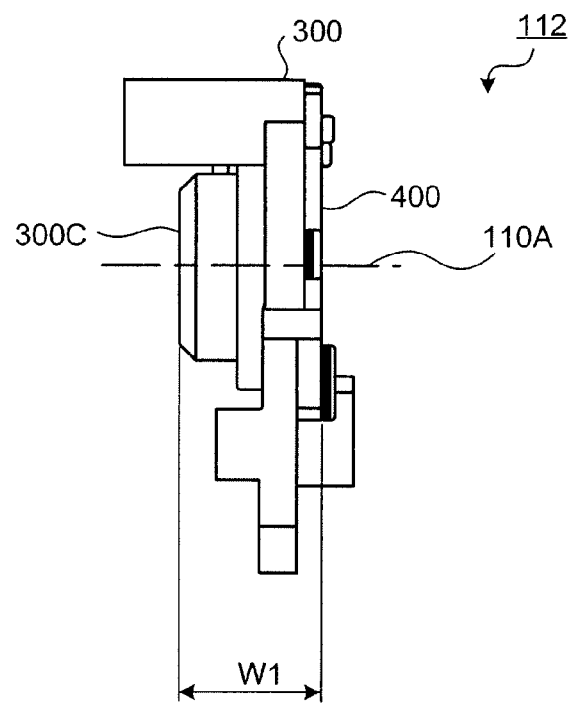
FIG. 12 is a side view illustrating the outer dimension of the shutter unit along the direction of an optical axis.
Figure 13:
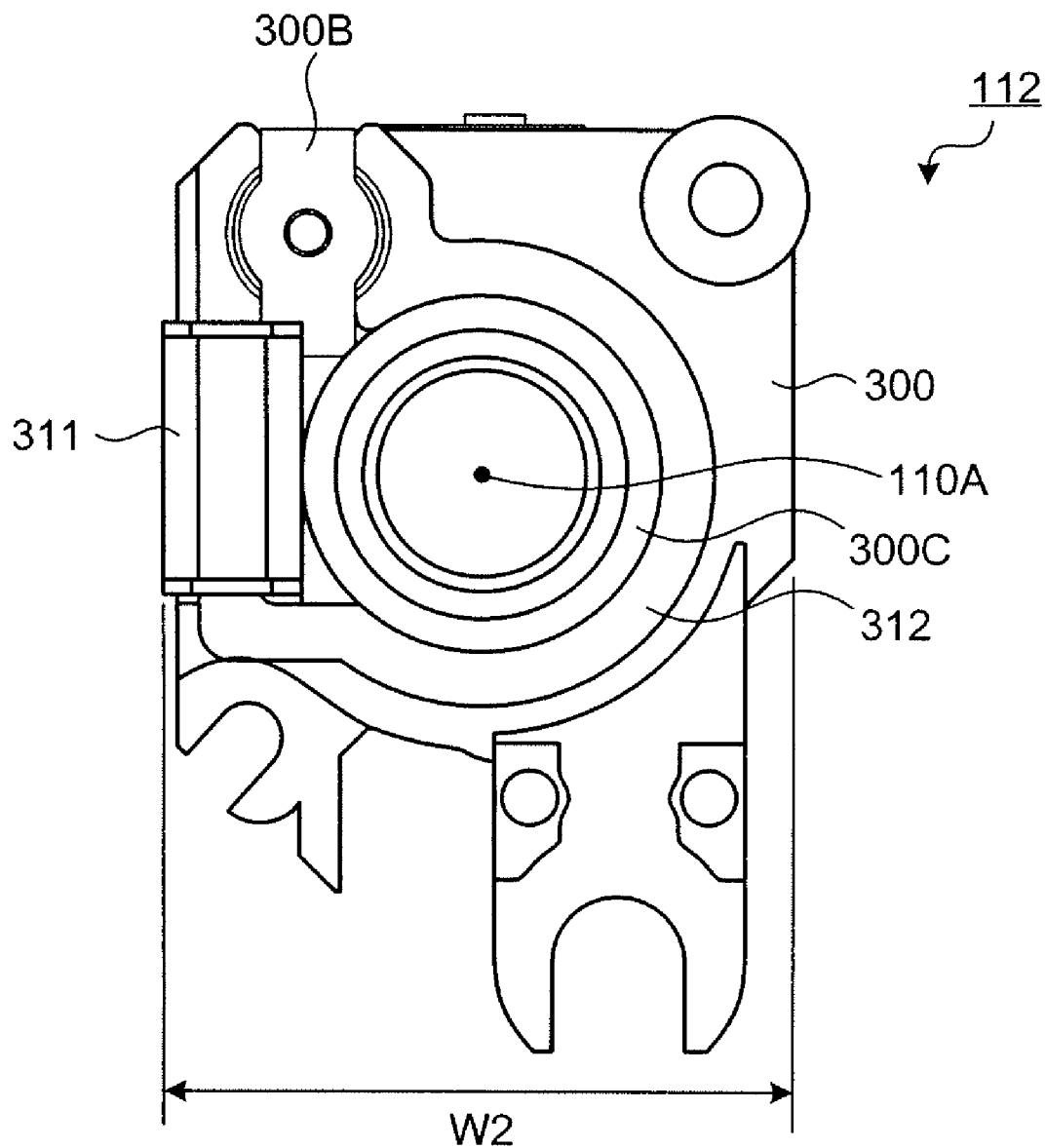
FIG. 13 is a plan view illustrating the outer dimension of the shutter unit orthogonal to the optical axis.

The outer dimensions of the shutter unit 112 in the above configuration are described. FIG. 12 is a schematic illustrating the outer dimension (thickness) of the shutter unit 112 along the direction of the optical axis 110A. FIG. 13 is a schematic illustrating the outer dimension (width) of the shutter unit 112 orthogonal to the optical axis 110A.

Figure 27:
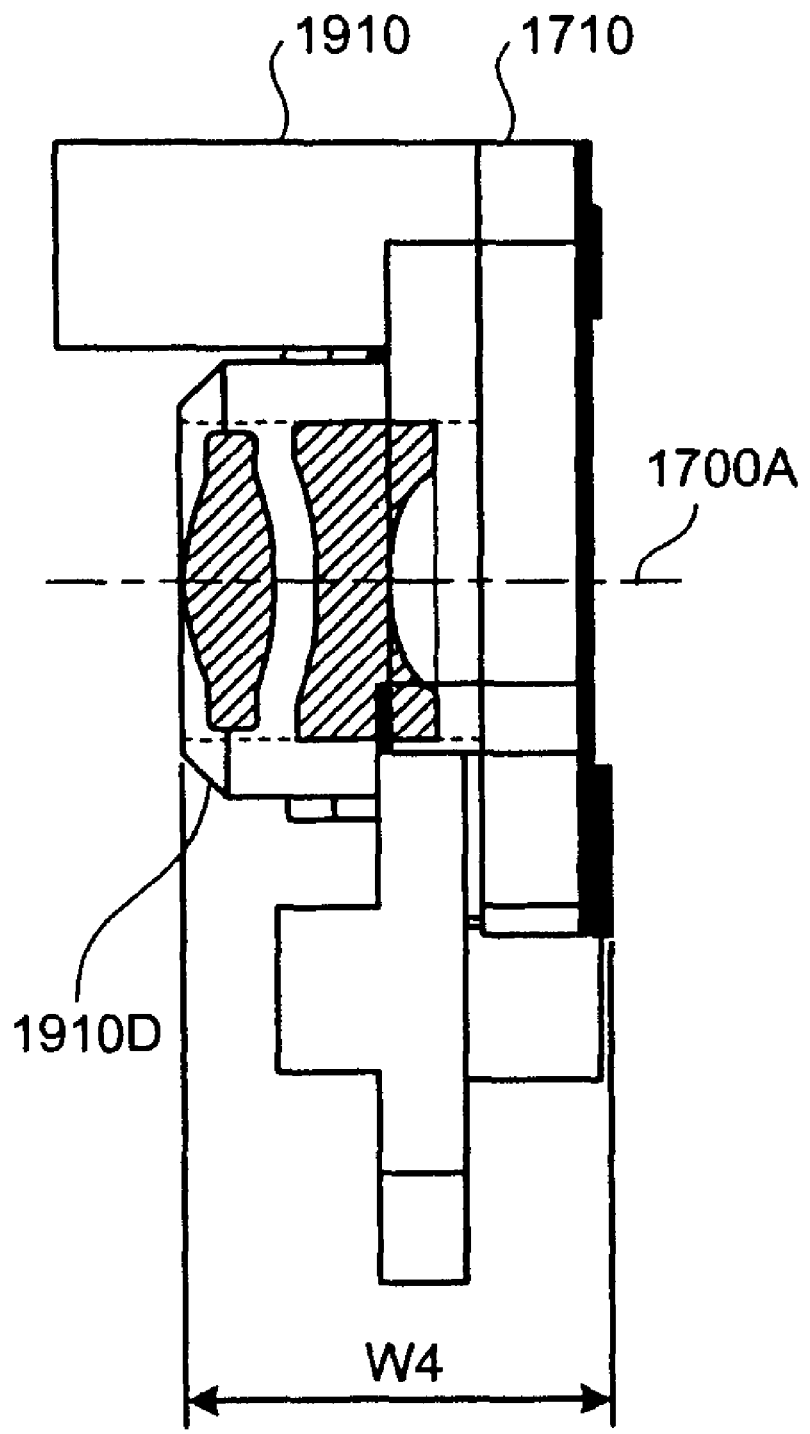
FIG. 27 is a cross-sectional view of a shutter unit and a lens unit that are integrated with each other.

The outer dimension (thickness) W1 of the shutter unit 112 along the direction of the optical axis 110A shown in FIG. 12 is smaller than the width W4 of the conventional shutter unit explained by FIG. 27. As the shutter unit 112 has a configuration in which all parts are assembled onto the base plate 300 of a single part, the number of parts can be reduced, and thus it is possible to make assembly and disassembly of the shutter unit 112 easy. Downsizing of the shutter unit 112 is realized by integration of the base plate 300 and the lens frame 300C.

The outer dimension (width) W2 of the shutter unit 112 orthogonal to the optical axis 110A shown in FIG. 13 is smaller than the width of the conventional shutter unit. In the shutter unit 112, the coil 311 can be located adjacent to the lens frame 300C, i.e., as close to the optical axis 110A as possible, since a yoke 312 having a substantially annular shape is employed, and downsizing of the shutter unit 112 is realized as a result.

Figure 14:
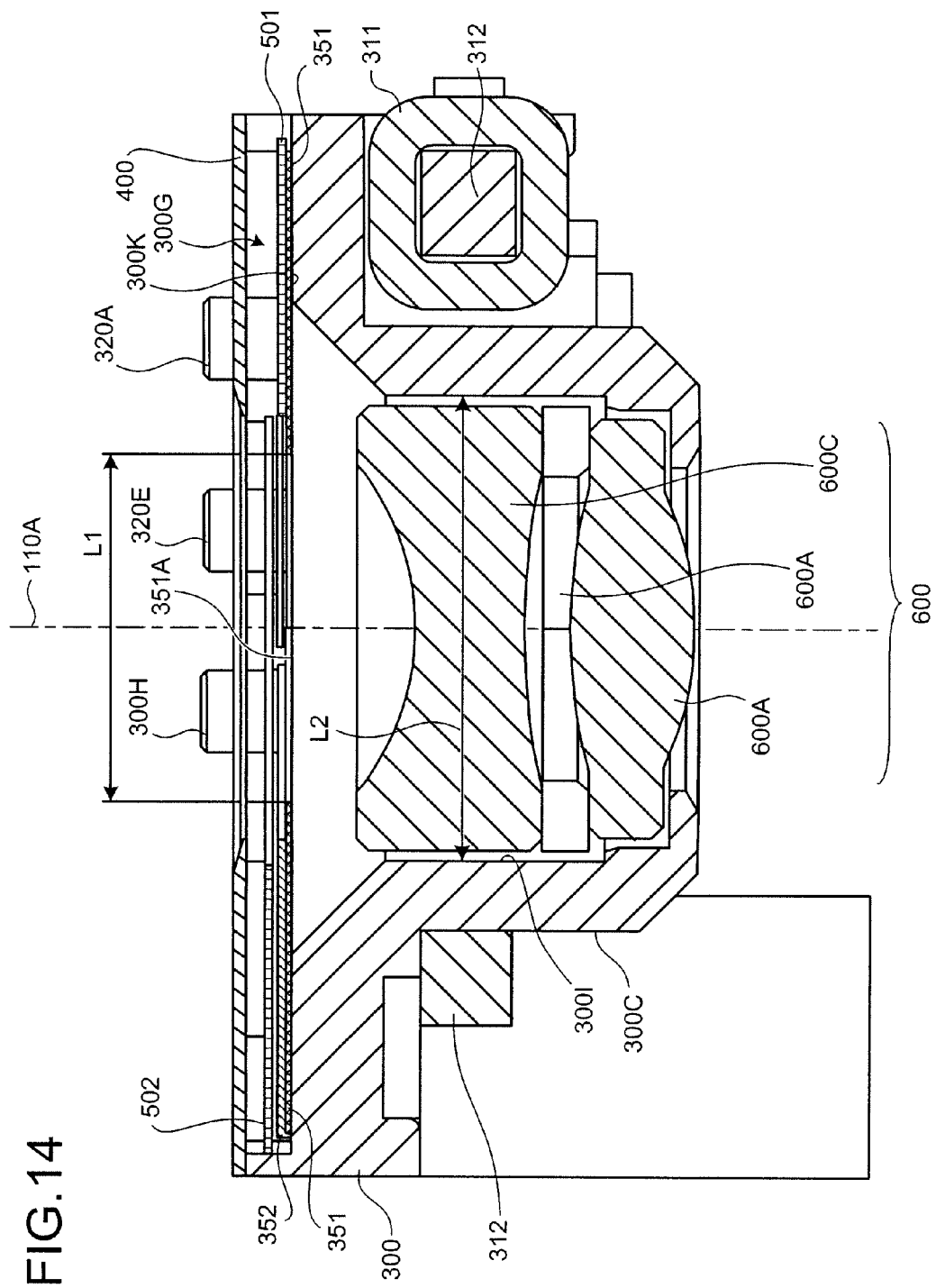
FIG. 14 is a cross-sectional side view of the shutter unit.
Figure 15:
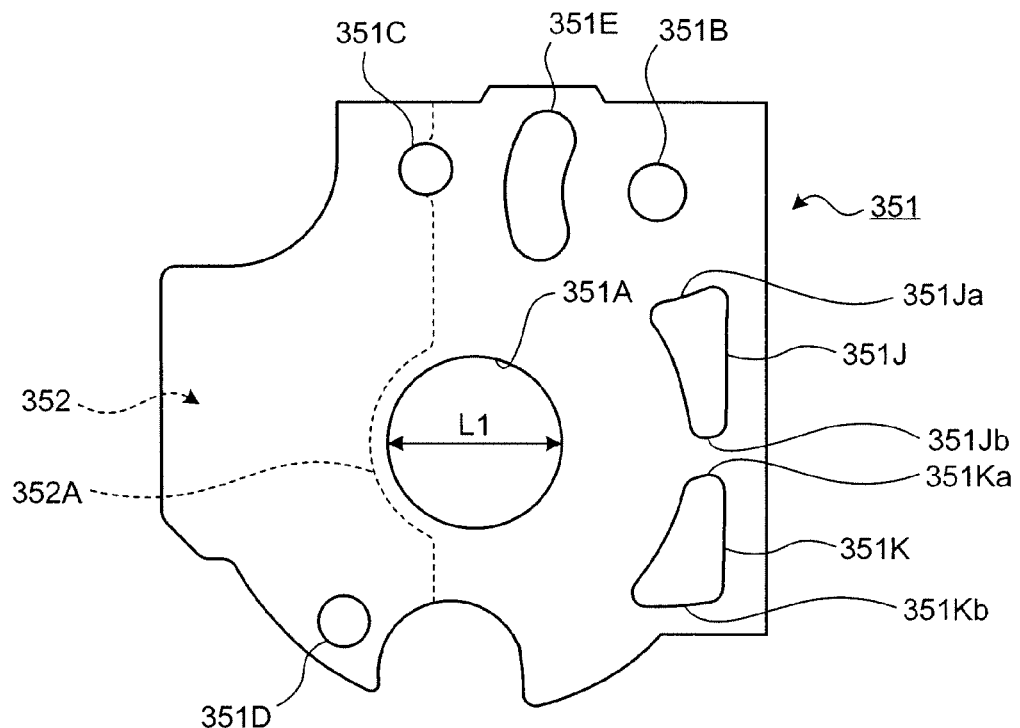
FIG. 15 is a plan view of a first sheet member.
Figure 16:
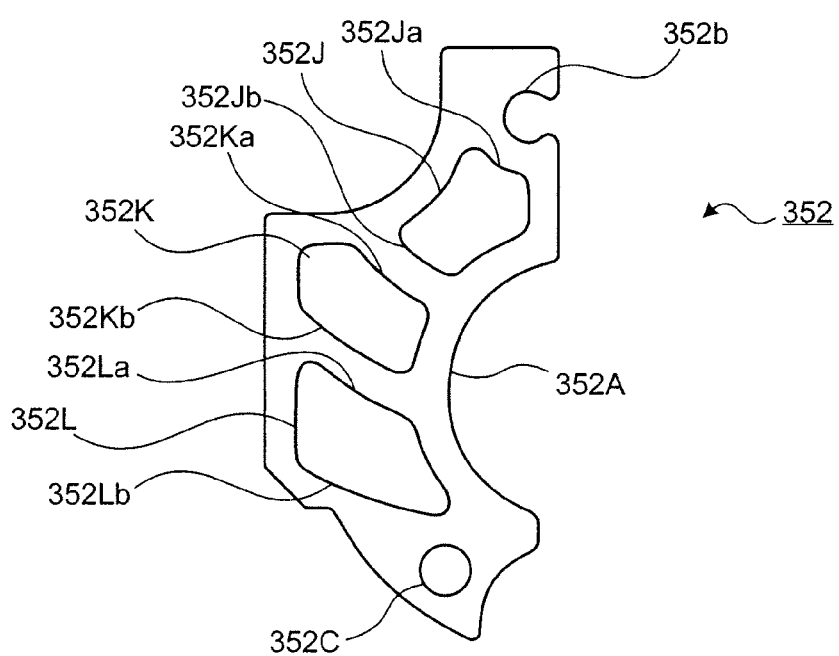
FIG. 16 is a plan view of a second sheet member.

FIGS. 14, 15, and 16 are a cross-sectional side view of a first and a second sheet member, a planar view of the first sheet member, and the planar view of the second sheet member, respectively.

As shown in FIG. 14, on one surface (bottom surface) 300K of the base plate 300 composing the space 300G, the first sheet member 351 is set so as to cover the entire area of the bottom surface 300K. As shown in FIG. 15, the aperture 351A having a predetermined diameter is formed in the center of the first sheet member 351. The aperture 351A has a diameter L1, and opens coaxially with the optical axis 100A. The diameter L1 of the aperture 351A is formed smaller compared to the inner diameter L2 of the opening 300I inside the lens frame 300C, where the second lens cluster 600 is inserted.

As the second lens cluster 600 requires alignment, the inner diameter L2 of the opening 300I to insert the second lens cluster 600 is formed larger than the opening diameter L1 of the aperture 351A. In this condition, as a preferable diameter of the aperture 351A is not possible, the first sheet member 351 is given the function of the aperture 351A by disposing it adjacent to shutter blades (sectors A 501 and B 502). In order to reduce the problematic reflection of light by the inner circumference (thickness) of the aperture 351A, the first sheet member 351 having the aperture is thinly formed.

As shown in FIG. 15, multiple openings are formed in the first sheet member 351. An opening 351B engages with the spindle 320A projecting from the base plate 300, an opening 351C engages with the projection portion 300H, and an opening 351D engages with a pin 300M projecting from the base plate 300 (FIG. 17), and by these engagements, the first sheet member 351 is positioned in the base plate 300. An arc-shaped opening 351E having a predetermined length is formed so as to follow the moving locus of the projection portion 320E, the locus moves when the sectors A 501 and B 502 open and shut, so that the movement of the projection portion 320E is not impeded.

The first sheet member 351 contacts the sector A 501 on the surface. Therefore, the first sheet member 351 has non-sliding portions 351J and 351K that do not contact the sector A 501 within the moving range of the opening and shutting of the sector A 501. The non-sliding portions 351J and 351K are formed by making openings in the first sheet member 351 in the shape following the moving pattern of the sector A 501. For instance, the non-sliding portions 351J and 351K have arcuate segments 351Ja and 351Jb, and 351Ka and 351Kb centering the spindle 320A that is the center of the sector A 501 for opening and shutting, and hence the sliding friction of the sector A 501 can be reduced.

The size of the second sheet member 352 is approximately a half of the first sheet member 351. In FIG. 15, the disposition position of the second sheet member 352, which is laid on the first sheet member 351, is depicted by dotted line. As shown, the second sheet member 352 is laid on the first sheet member 351 in a position away from the aperture 351A of the first sheet member 351. As shown in FIG. 16, the second sheet member 352 has an arcuate portion 352A in a position at a predetermined distance from and following the contour of the aperture 351A of the first sheet member 351. For instance, the second sheet member 352 is located out of the range of the opening and shutting movement of the sector A 501, and located within the range of the opening and shutting movement of the sector B 502.

While the second sheet member 352 is also thinly formed, as the thickness of the second sheet member 352 does not affect the thickness of the first sheet member 351 at the portion of the aperture 351A, light reflection associated with the thickness of the aperture 351A is not increased. The second sheet member 352 contacts the surface of the sector B 502, but does not contact the sector A 501. The thickness of the second sheet member 352 is set to be thicker than that of the sector A 501. Thus, the movement of the sector B 502 can be stabilized, and the position of the opening and shutting movement of the sector B 502 in the direction of optical axis does not intersect with the position of the opening and shutting movement of the sector A 501, and hence both the sectors A 501 and B502 can move smoothly.

The second sheet member 352 contacts the sector B 502 on the surface. Therefore, the second sheet member 352 has non-sliding portions 352J, 352K, and 352L that do not contact the sector B 502 within the moving range of the opening and shutting of the sector B 502. The non-sliding portions 352J, 352K, and 352L are formed by making openings in the second sheet member 352 in the shape following the moving direction of the sector B 502. For instance, the non-sliding portions 352J, 352K, and 352L have arcuate segments 352Ja and 352Jb, 352Ka and 352Kb, and 352La and 352Lb centering the spindle 300H, which is the center of the sector B 502 for opening and shutting, and hence the sliding friction of the sector B 502 can be reduced.

Although the non-sliding portions 351J and 351K of the first sheet member 351 and 352J, 352K, and 352L of the second sheet member 352 are formed by making perforated openings in the first and second sheet members 351 and 352, configuration is not limited thereto. The non-sliding portions 351J and 351K, or 352J, 352K, and 352L can be in the shape that can reduce the contacting area by partial contact with the sector A 501 or B 502, respectively, and for example, may be formed on the surfaces facing the sectors A 501 or B 502, if not by making openings, by making depressions that do not contact the sectors A 501 or B 502.

The first and second sheet members 351 and 352 can be formed with the same material as the sectors A 501 and B 502 (for example, a plastic resin film substrate such as a polyester film that is lubricant-coated in a black color). In this way, sliding friction can be reduced.

Figure 17:
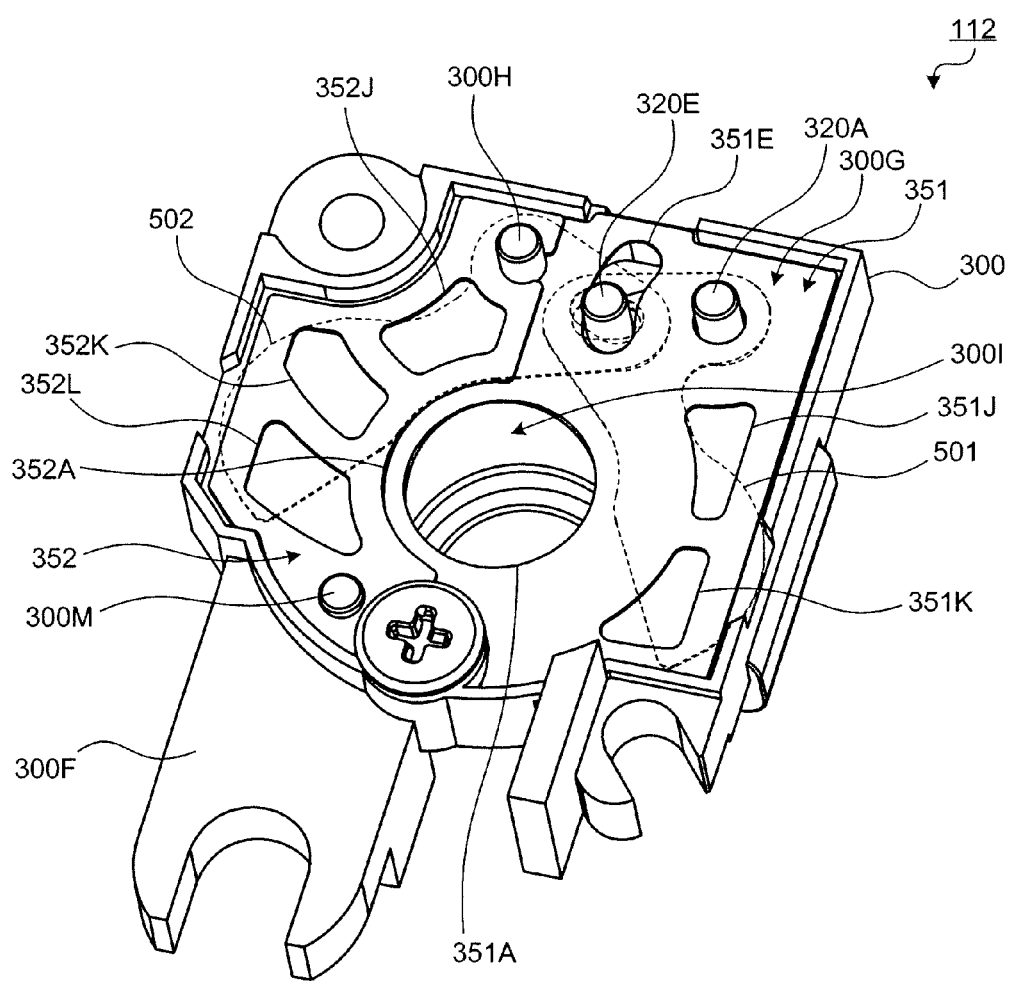
FIG. 17 is a perspective view illustrating the shutter unit.

FIG. 17 is a perspective view of a shutter unit according to the present invention. The open position of the sectors A 501 and B 502 are illustrated by a dotted line. In the space 300G of the base plate 300, the first and second sheet members 351 and 352 are layered. The aperture 351A of the first sheet member 351 is given a diameter smaller than the opening 300I of the base plate 300, and can be opened in a position as close to the sectors A 501 and B 502 as possible. In general, as luminous flux converges most at the aperture 351A, if the sector unit 500 is located in a position apart from the aperture 351A, the range of the opening and shutting motion of the sector unit 500 for shutter operation is lengthened and thus exposure time is lengthened. Based on the above configuration of the present invention, however, exposure time can be shortened by disposing the sector units adjacent to sheet members that have an aperture as hence the shutter operation by a sector unit can be done at the position where luminous flux most converges.

As the portion of the second sheet member 352 closest to the aperture 351A of the first sheet member is formed as the arcuate portion 352A apart from the aperture 351A at a predetermined distance, the diameter defined by the aperture 351A of the first sheet member 351 and the thickness of the area around the aperture 351A can be made as thin and uniform as possible, and thus light reflection associated with the thickness of the aperture 351A can be reduced as much as possible. As the step formed between the layered sectors A and B is flushed with two layered sheet members, the formation can be easier and more economical than disposing a single stepped sheet member.

The positioning of the sectors A 501 and B 502 is not achieved by contact with the base plate 300 or the like. Each position of the sectors A 501 and B 502 when the sectors A 501 and B 502 are open and shut is determined by positioning portions.

Figure 18:
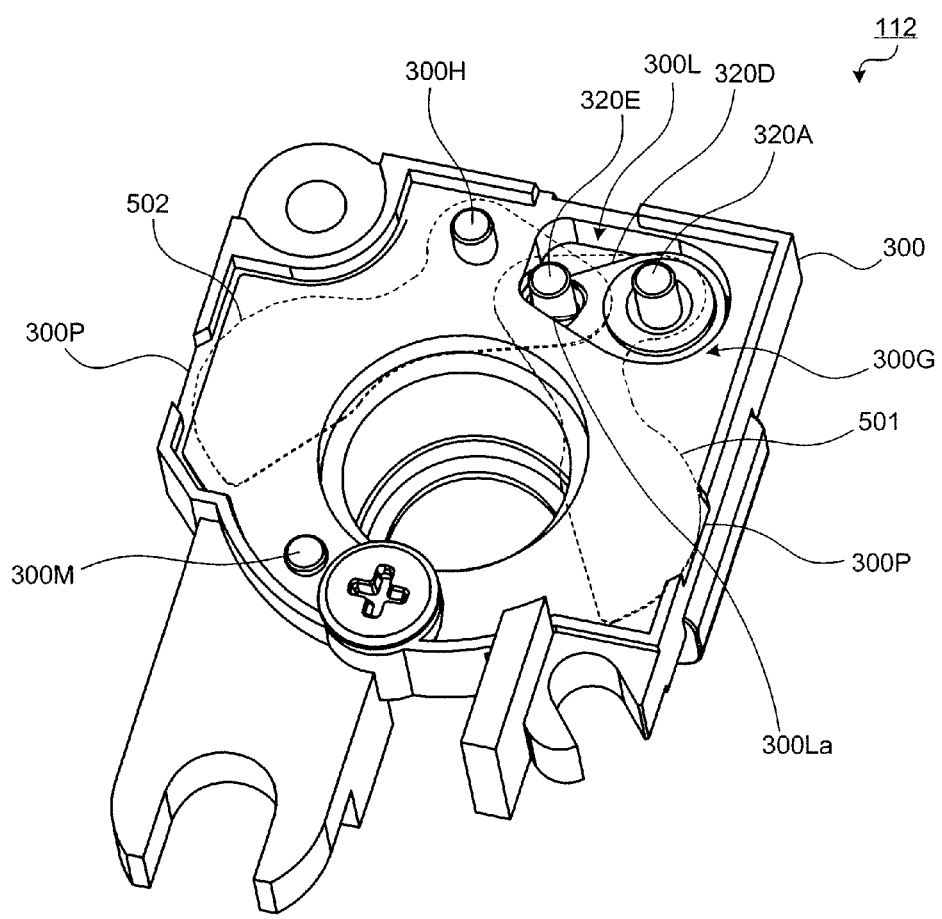
FIG. 18 is a perspective view illustrating sectors fully opened.

FIG. 18 is a perspective view illustrating the sectors fully opened. The sectors A 501 and B 502 are indicated by alternating long and short dashed lines. The first and second sheet members 351 and 352 are omitted to show the base plate 300 hidden behind the first sheet member 351.

As also shown in FIG. 5, the arm 320D, which rotates with the spindle 320A, is formed on the rotor 320, and the projection portion 320E is formed near the tip of the arm 320D. The projection portion 320E projects to the space 300G penetrating the opening 300L formed in the base plate 300. As shown in FIG. 18, when the sectors A 501 and B 502 fully open, the side portion of the tip of the arm 320D on the rotor 320 contacts one end 300La of the opening 300L. The opening 300L and the projection portion 320E, which contact each other, form a positioning portion to determine the fully opened position of the sectors A 501 and B 502.

Thereby the fully opened position of the sectors A 501 and B 502 engaged with the projection portion 320E can be determined. In the portion on the base plate 300 where the sectors A 501 and B 502 come close when fully opened, a notched portion is formed to prevent contact of the sectors A 501 and B 502 with a part of the base plate 300. Thus, the fully opened position of the sectors A 501 and B 502 can be determined without damage thereto or deformation thereof.

Figure 19:
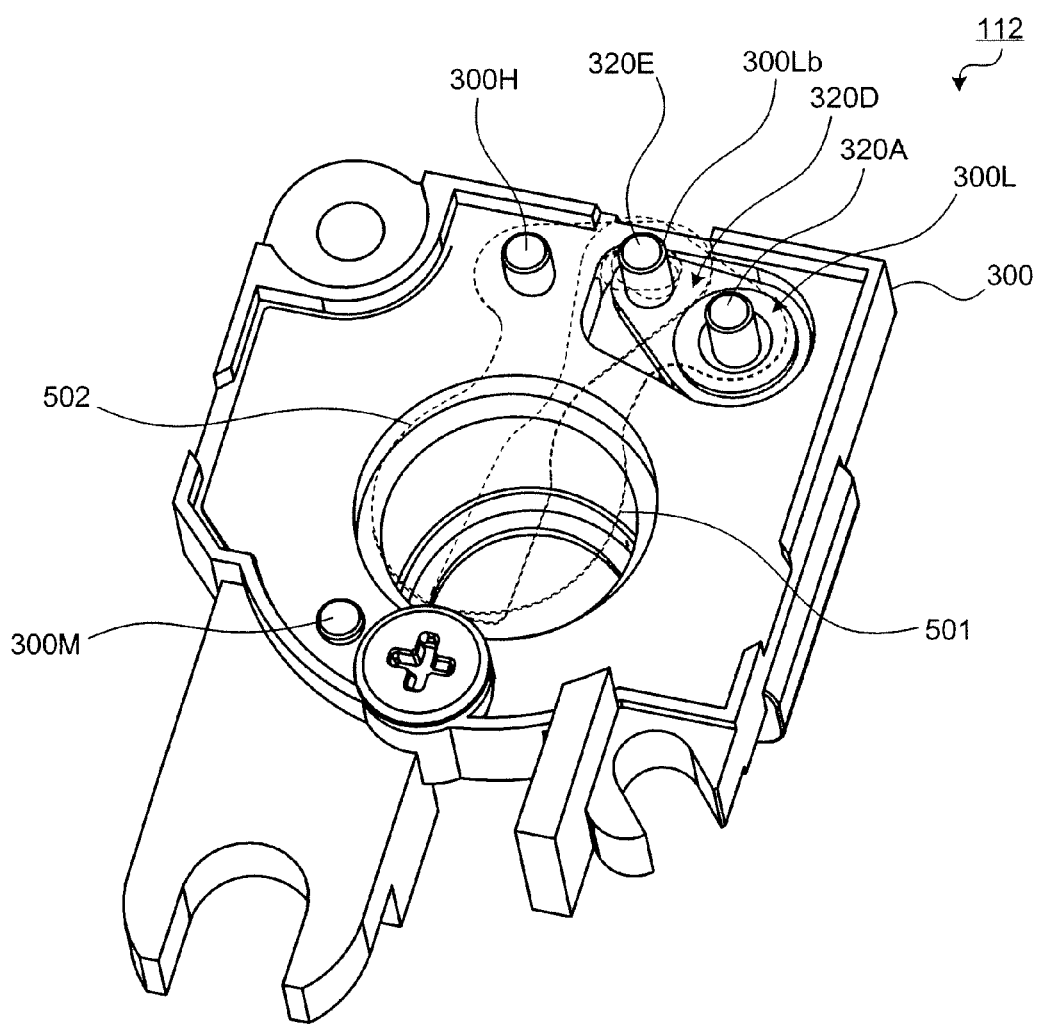
FIG. 19 is a perspective view illustrating sectors fully shut.

FIG. 19 is a perspective view illustrating the sectors fully shut. The positioning portion also determines the position of the sectors A 501 and B 502 when the sectors A 501 and B 502 fully shut. As shown in FIG. 19, when the sectors A 501 and B 502 fully shut, the side portion of the tip of the arm 320D on the rotor 320 contacts one end 300Lb of the opening 300L. The opening 300L and the projection portion 320E contact each other and determine the fully shut position of the sectors A 501 and B 502, and the sectors A 501 and B 502 can be stopped at a predetermined fully shut position.

Figure 20:
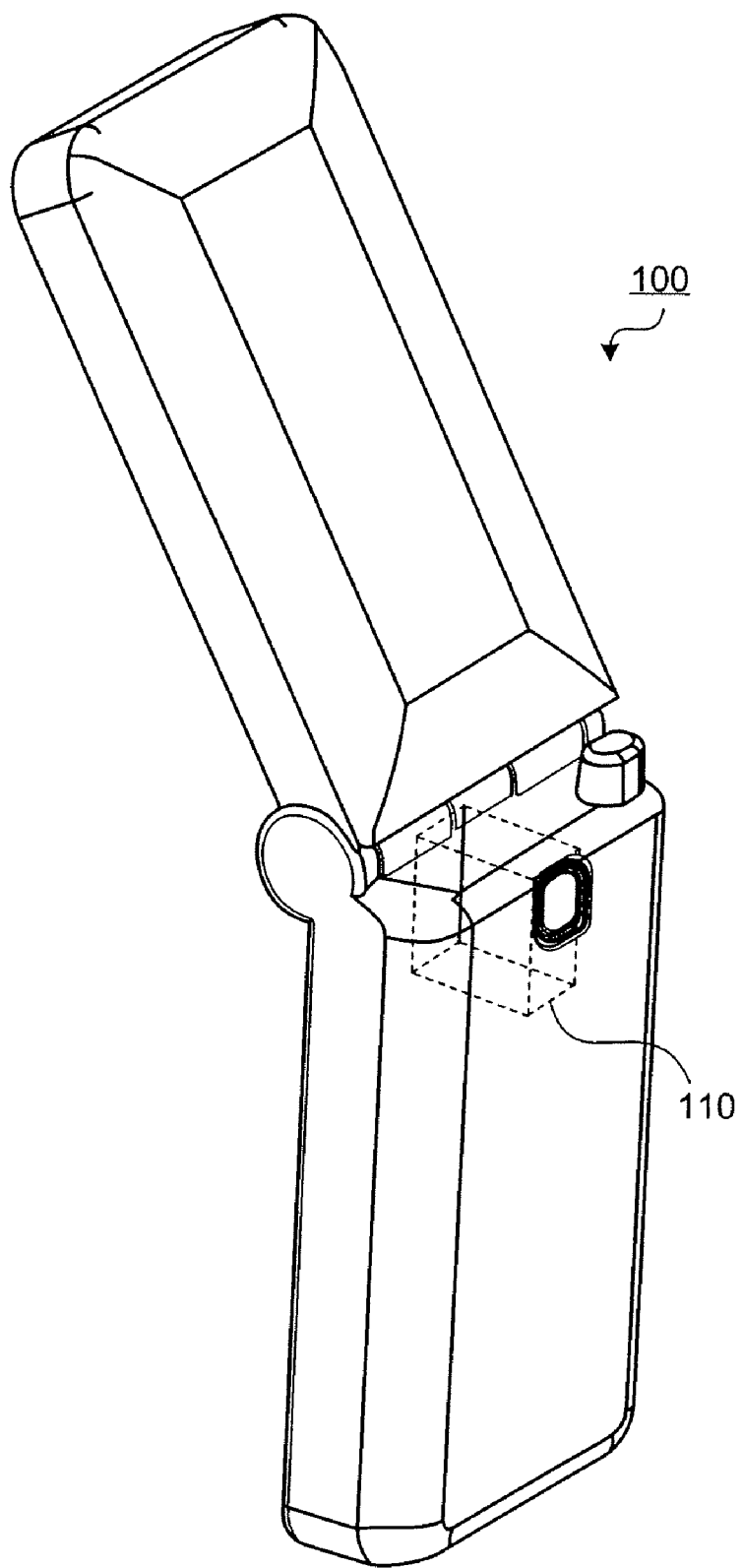
FIG. 20 is a perspective view of a cellular telephone according to a first embodiment of the present invention.

FIG. 20 is a perspective view illustrating a cellular telephone according to the first embodiment of the present invention.

In FIG. 20, a cellular telephone 100 has a camera function and includes a camera module 110. The camera module 110 includes the shutter unit 112, and receives the reflected light of an object through the operation of the cellular telephone 100 by a user. The camera module produces an image of the reflected light received, and outputs an electrical signal corresponding to the reflected light to an analog-to-digital converter (A/D converter) (not illustrated) or the like equipped in the camera module 110.

Figure 21:
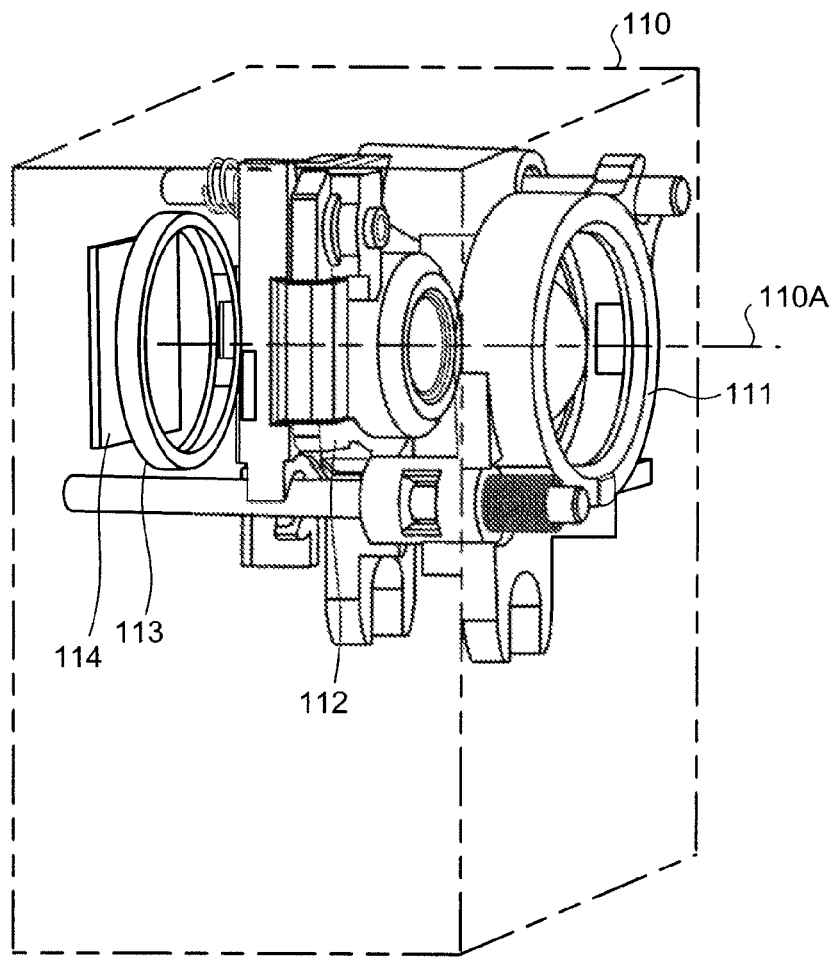
FIG. 21 is a schematic of a camera module according to the first embodiment.

FIG. 21 is a schematic illustrating the camera module 110 according to the first embodiment of the present invention.

In FIG. 21, the camera module 110 includes a box-shaped case, a lens unit 111 disposed inside the case, the shutter unit 112, the lens unit 113, and the CCD 114.

The lens unit 111 is movable in the direction of the optical axis 110A and disposed on the object side along the direction of the optical axis 100A. The lens unit 111 has a first lens cluster (i.e., focus lens cluster) that includes a single or multiple lens(es), and the reflected light of an object is focused at delivery to the CCD 114 by the reciprocal movement of the lens unit 111 along the direction of the optical axis 110A.

The shutter unit 112 is movable in the direction of the optical axis 110A and disposed between the lens units 111 and 113 in the case. The shutter unit 112 has a second lens cluster (i.e., zoom lens cluster) including a single or multiple lens(es), and the size of the reflected light of an object (i.e., image size) is adjusted at delivery to the CCD 114 by the reciprocal movement of the shutter unit 112 along the direction of the optical axis 110A. The shutter unit 112 includes the shutter unit according to the present invention, and the quantity of the reflected light of an object delivered to the CCD 114 is mechanically regulated by the shutter unit.

The lens unit 113 is immovably disposed between the shutter unit 112 and the CCD 114 in the case, and has a third lens cluster (for example, a filter lens cluster to filter unnecessary reflection) that includes a single or multiple lens(es). The CCD 114 is immovably disposed on the imaging plane side along the optical axis 110A in the case, and receives reflected light of an object that is imaged through the first, second, and third lens clusters, and outputs an electrical signal corresponding to the quantity of the reflected light to an A/D converter (not illustrated) or the like equipped in the camera module 110.

As described above, by employing the shutter unit 112 according to the first embodiment of the present invention, which employs the substantially annular-shaped yoke 312 disposed to encircle the outer circumference of the lens frame 300C, the coil 311 and the coil 312 can be arranged in a position adjacent to the lens frame 300C, i.e., as close to the optical axis 110A as possible. Thereby, the width (an outer dimension orthogonal to the optical axis 110A) of the shutter unit 112 can be minimized.

By assembling all parts onto the base plate 300 composed of a single part, and particularly, by integrating the base plate 300, the lens frame 300C, the bearing 300B, and the space 300G integrally, the number of parts can be reduced, making the assembly and disassembly of the shutter unit 112 easy. Consequently, the shutter unit 112 can be further downsized, and the maintainability of the shutter unit 112 can be improved.

Although the opening diameter of the opening 300G becomes relatively large for aligning lenses since the base plate 300 is an integrated form of the lens frame 300C and the space 300G to accommodate the sector unit 500, a desired aperture diameter can be easily obtained by disposing the first sheet member 351, having the aperture 351A, adjacent to the sector unit 500. The first sheet member 351 reduces the sliding friction of the sector A 501. The sliding friction of the sector B 502 is reduced by the second sheet member 352 that is layered on the first sheet member 351. The second sheet member 352 has a thickness corresponding to the thickness of the sector B 502 to prevent the intersection of the sectors A 501 and B 502, and smooth opening and shutting operations can be realized. Thereby, the reduction of shutter speed can be diminished, enabling high speed shutter operation.

The first and second sheet members 351 and 352 do not interfere with the downsizing of a shutter unit with a built-in lens that has a potential to be downsized by integrating lenses and a shutter, can provide a desired aperture diameter easily, and reduce the sliding friction of the sector unit 500. These functions can be easily implemented by forming sheet members that are easily disposed in a shutter unit.

By employing the yoke 312, which is positioned and set by the positioning portion 300S formed on the bearing 300B and anchored by the anchoring flukes 300D as a fitting portion, the assembly and disassembly of the shutter unit 112 are made easy.

The cellular telephone 100 can be further downsized, and the maintainability of the cellular telephone 100 can be improved by employing the downsized shutter unit 112 having improved maintainability.

While a straight-shaped coil 311 is employed in the shutter unit 112 according to the first embodiment, a coil 311 that is shaped according to the shape of a yoke 312 may be employed. For example, a curved coil 311, a flexible coil 311, or a single or multiple small coil(s) may be employed. Thereby, the coil 311 can be disposed closer to the lens frame 300C, allowing downsizing by locating the yoke 312 closer to the opening 300E. Consequently, the shutter unit 112 and the cellular telephone 100 employing it can be further downsized.

Figure 22:
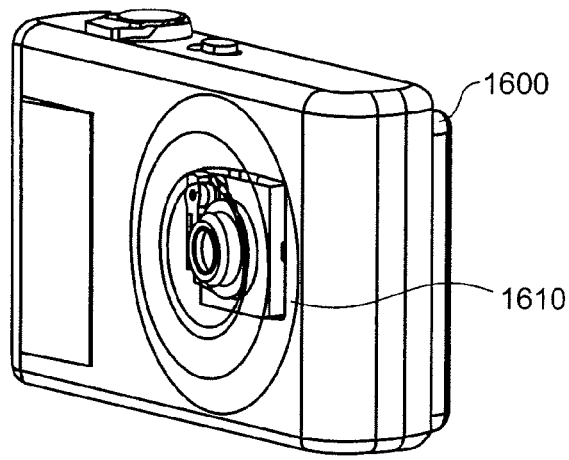
FIG. 22 is a perspective view of a digital camera according to a second embodiment of the present invention.
Figure 23:
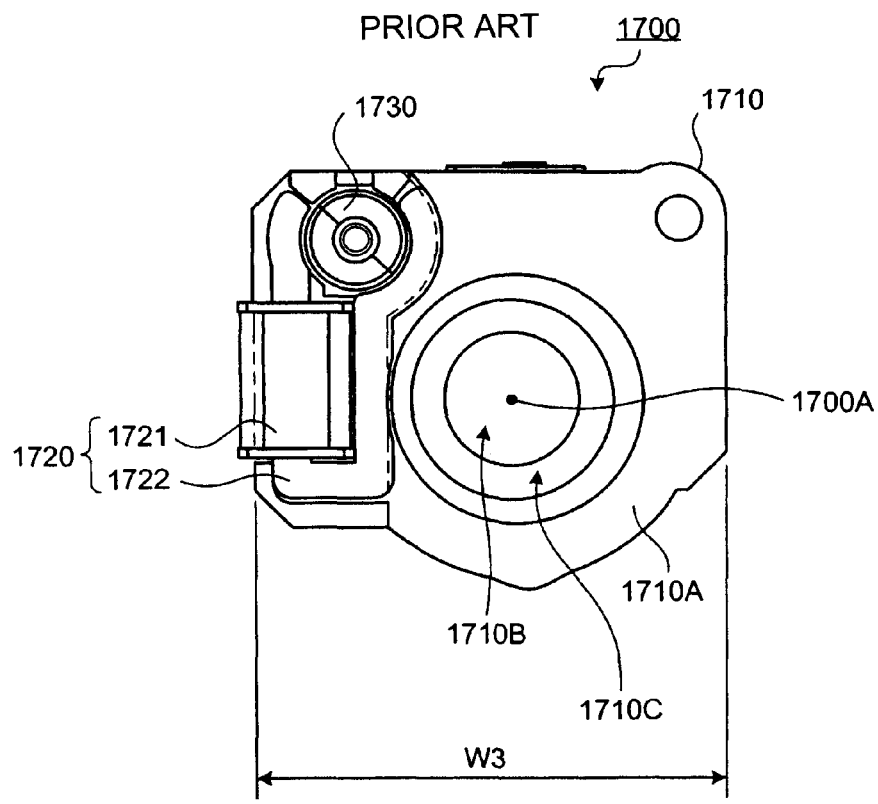
FIG. 23 is a plan view illustrating a conventional shutter unit.
Figure 24:
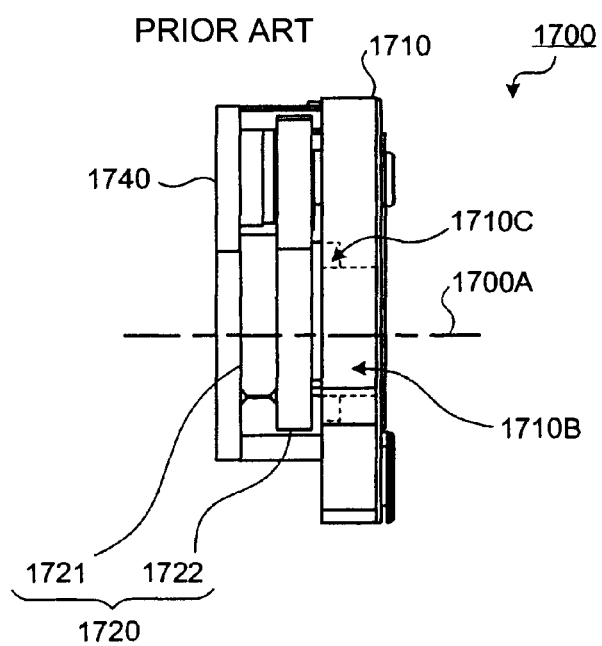
FIG. 24 is a side view of a conventional shutter unit.
Figure 25:
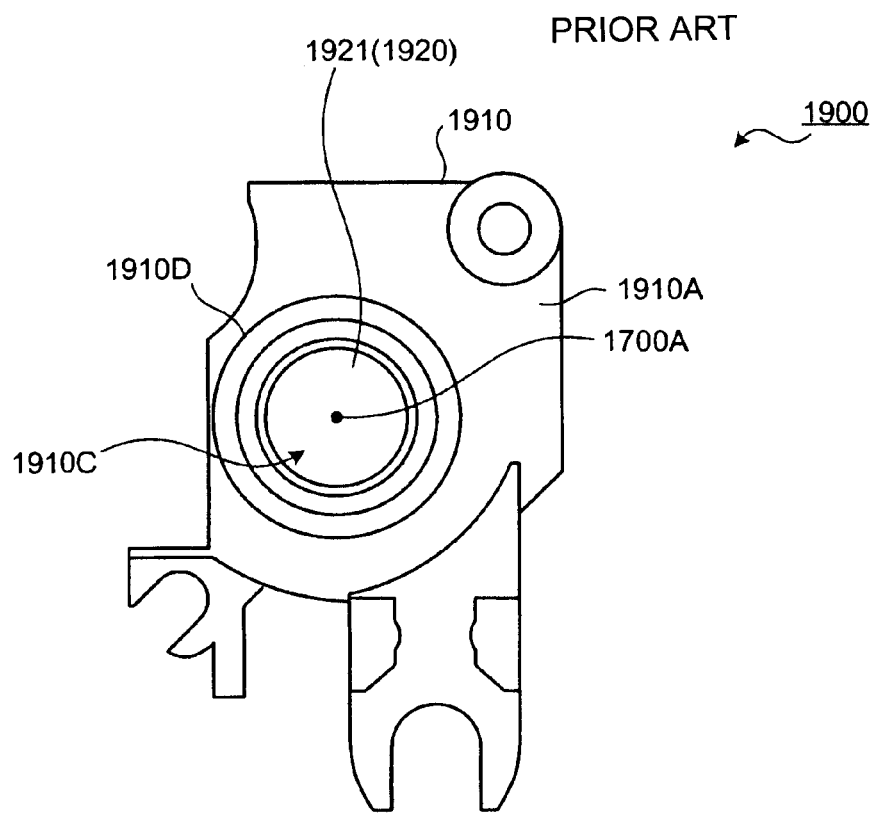
FIG. 25 is a plan view illustrating a conventional lens unit.
Figure 26:
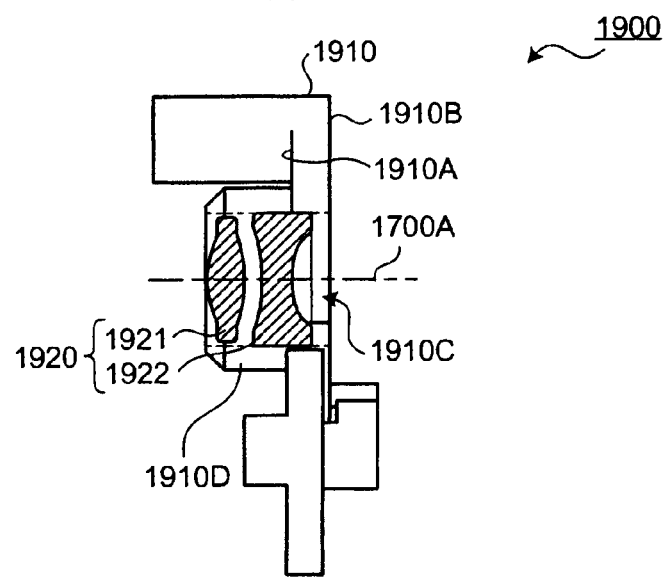
FIG. 26 is a cross-sectional view of a conventional lens unit.

A second embodiment is a digital camera employing the shutter unit or the shutter unit with a built-in lens according to the present invention. FIG. 22 is a perspective view illustrating a digital camera according to the second embodiment of the present invention.

A digital camera 1600 is equipped with a shutter unit 1610 that is downsized and improved in maintainability by employing the same configuration as the shutter unit 112 described in the first embodiment. By employing the shutter unit 1610, the digital camera 1600 can be further downsized, and the maintainability of the digital camera 1600 can be improved. Application of the shutter unit according to the present invention is not limited to cellular telephones and digital cameras and can also be applied to any type of imaging apparatus.

Although in the first and second embodiments, a configuration in which the coil 311, the yoke 312, the rotor 320, and the bearing 300B are assembled onto the base plate 300 is described, these parts may be assembled similarly onto the back plate 400 on the opposite side as a plate member.

Although in the first and second embodiments, an example in which the base plate 300 is applied as the lens barrel of the second lens cluster among the multiple lens clusters, the base plate 300 may be applied as the lens barrel of, e.g., each lens cluster of the latter part of a first lens, a third cluster, a fourth cluster, a fifth cluster, and parts thereof. Only an opening without any lens may be employed.

Although in the first and second embodiments, an example in which one of two bearings for the rotor 320 is located on the base plate 300 and the other is located on the back plate 400, both may be located on the base plate 300 or on the back plate 400.

As described above, the shutter unit, the shutter unit with a built-in lens, and the imaging apparatus according to the present invention can be applied to any type of imaging apparatus, and is particularly suitable for the application to imaging apparatuses such as cellular telephones and compact digital cameras that have limited space for installation of a shutter unit.

The present embodiments effect provision of a further downsized shutter unit, a shutter unit with a built-in lens that can be downsized while maintaining desired aperture diameter, and an imaging apparatus employing the shutter units.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The present document incorporates by reference the entire contents of Japanese priority document, 2006-213791 filed in Japan on Aug. 4, 2006 and Japanese priority document, 2006-258257 filed in Japan on Sep. 25, 2006.

What is claimed is:

1. A shutter unit comprising:
   a base plate having an opening;
   a drive unit including a coil and a yoke, wherein the coil includes:
      a bobbin having a hole; and
      copper wire that is wound around the hole,
   a rotor configured to rotate by operation of the drive unit; and
   a sector unit configured to open and shut the opening by a rotating motion of the rotor,
   wherein the yoke, an inside circumference of which encircles an outside circumference of the opening, extends through the hole with both ends of the yoke being close to the rotor and forming a substantially annular shape.

2. The shutter unit according to claim 1, wherein the base plate has a rotor housing that accommodates the rotor and a bearing that journals the rotor.

3. The shutter unit according to claim 2, wherein the bearing has a positioning portion that maintains both ends of the yoke and a side of the rotor at a predetermined distance.

4. The shutter unit according to claim 1, wherein the base plate has a space and a plate member filling the space, the space accommodating the sector unit.

5. The shutter unit according to claim 1, wherein a length, a quantity, and a location of the coil are determined based on a shape of the yoke.

6. The shutter unit according to claim 1, further comprising:
   a frame that projects from the base plate and that has an opening,
   wherein the yoke is disposed and formed in a substantially annular shape encircling a circumference of the frame.

7. The shutter unit according to claim 6, wherein the yoke engages with the circumference of the frame in a fixed position.

8. The shutter unit according to claim 7, wherein the base plate has a fitting portion that anchors the yoke.

9. The shutter unit according to claim 6, wherein:
   the frame has a substantially annular shape, and
   the substantially annular shape of the yoke conforms to the circumference of the frame.

10. The shutter unit according to claim 9, wherein the yoke includes a substantially annular portion along the circumference of the frame and a straight portion where the coil is attached.

11. The shutter unit according to claim 6, wherein the frame is formed integrally with the base plate.

12. The shutter unit according to claim 1 wherein the opening is disposed with a lens.

13. An imaging apparatus comprising the shutter unit according to claim 1.

14. A shutter unit comprising:
   a base plate that has an opening and a space;
   a drive unit that includes a coil and a yoke;
   a rotor configured to rotate by operation of the drive unit;
   a sector unit that is disposed in the space, and configured to open and shut the opening by a rotating motion of the rotor; and
   a sheet member that has an exposure aperture with a predetermined exposure diameter on an optical axis,
   wherein the sector unit includes a pair of sectors, and is configured to open and shut the exposure aperture by an opening and shutting operation of the pair of sectors, and
   the sheet member includes a first sheet member and a second sheet member that are layered,
   wherein the first sheet member contacts a first sector of the pair of sectors and forms the exposure aperture and,
   wherein the second sheet member is laid on the first sheet member, is disposed in a position apart from the exposure aperture and the first sector, and contacts a second sector of the pair of sectors.

15. The shutter unit according to claim 14, wherein the opening is disposed with a lens.

16. The shutter unit according to claim 14, wherein the sheet member is disposed in a space between the base plate and the sector unit, and contacts the sector unit.

17. The shutter unit according to claim 14, wherein the sheet member has, on the surface facing the sector unit, non-sliding portions that do not contact the sector unit.

18. The shutter unit according to claim 17, wherein the non-sliding portions have a shape conforming to a movement pattern of the sector unit.

19. The shutter unit according to claim 14, wherein a thickness of the second sheet member is equal to or greater than that of the first sector.

20. An imaging apparatus comprising the shutter unit according to claim 14.

21. A shutter unit comprising:
   a base plate including a frame unit for a lens to be inserted and an opening;
   a drive unit including a coil and a yoke;
   a rotor configured to rotate by operation of the drive unit;
   a sector unit configured to open and shut the opening by a rotating motion of the rotor,
   wherein the yoke, an inside circumference of which encircles an outside circumference of the opening, extends with both ends of the yoke being close to the rotor and forms a substantially annular shape.

* * * * *